Nov. 22, 1932.　　　　F. W. STEIN　　　　1,888,777
SPARE TIRE COVER AND RADIO AERIAL
Filed March 24, 1930
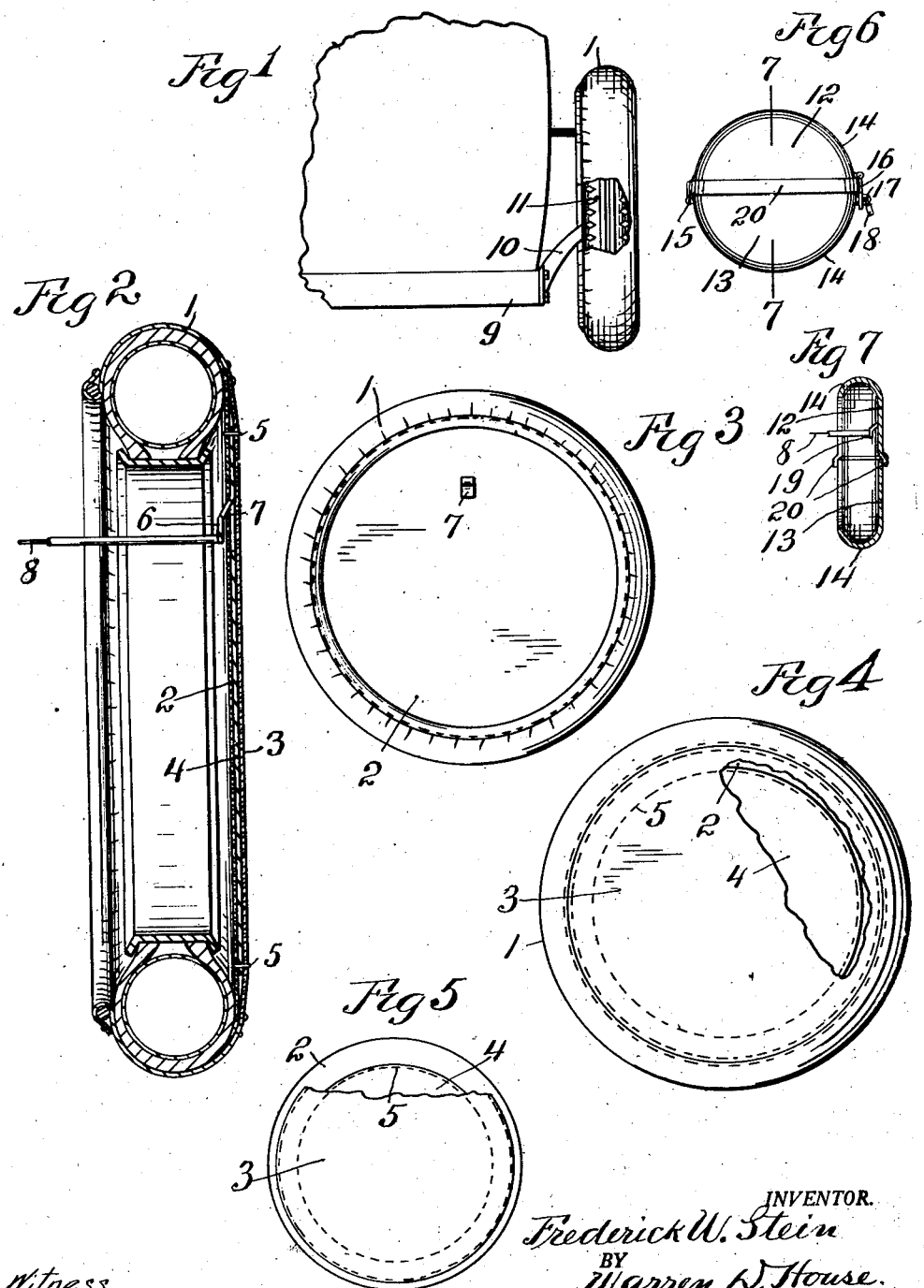

Patented Nov. 22, 1932

1,888,777

UNITED STATES PATENT OFFICE

FREDERICK W. STEIN, OF ATCHISON, KANSAS

SPARE-TIRE COVER AND RADIO AERIAL

Application filed March 24, 1930. Serial No. 438,439.

My invention relates to improvements in spare-tire covers and radio aerials.

One of the objects of my invention is to provide a novel spare-tire cover which will serve the double functions of a spare-tire cover and a radio aerial adapted for use with a radio receiving set carried by a car on which the spare-tire is mounted.

A further object of my invention is to provide a novel combined spare-tire cover and radio aerial which is simple, cheap, durable, strong, not likely to get out of order, which is not liable to be interfered with by the elements, which may be easily and quickly mounted in or removed from its operative position, and which is efficient in its operation.

The novel features of my invention are hereinafter fully described and claimed.

In the accompanying drawing, which illustrates my invention,

Fig. 1 is a side elevation of my improved tire cover and aerial, partly broken away, shown mounted on a spare-tire carried by a car.

Fig. 2 is an enlarged central vertical sectional view of the tire cover and aerial shown in Fig. 1, shown mounted on a spare-tire carried by a rim.

Fig. 3 is a front elevation of my improved tire cover and aerial, shown in Figs. 1 and 2.

Fig. 4 is a rear view, partly broken away, of the same.

Fig. 5 is a reduced plan view, partly broken away, of the insulation body portion and the aerial therein, of the tire cover and aerial shown in the preceding figures.

Fig. 6 is a reduced rear elevation of a modification of my improved tire cover and aerial.

Fig. 7 is a section on the line 7—7 of Fig. 6.

Similar reference characters designate similar parts in the different views. My invention provides a suitable casing of any desired form, having an opening adapted to receive a spare-tire carried by an automobile, and provided with electric conductive means adapted to intercept radio waves or oscillations, and an aerial conductor attached to said means and adapted for electrical connection with a radio receiving set carried by the automobile.

Referring to the form of my invention shown in Figs. 1 to 5 inclusive, 1 designates a flexible, annular, peripheral, channel portion of my improved tire cover, which portion corresponds to the like portion of spare-tire covers of a type in general use.

The body of my improved tire cover comprises a front layer 2 of insulation material, such as water proofed fabric, and a rear smaller layer 3 of similar material, said two layers 2 and 3 being stitched to each other and to the peripheral portion 1, or otherwise fastened together.

Between the layers 2 and 3 of insulation is disposed electric conductive means adapted to intercept radio waves or oscillations and adapted to serve as an aerial for connection with a radio receiving set carried by the car which carries the spare-tire.

Such electric conductive means comprises, preferably a metal aerial, such as a sheet of aluminum, copper, steel, iron, or tin or lead foil, designated by 4. The metal sheet 4 is, preferably, of smaller diameter than the smaller insulation layer 3, and it may be fastened to the sheet layers 2 and 3 which envelop it by stitching 5, as shown in Figs. 2, 4 and 5.

The metal aerial 4 is provided with means adapted for attachment electrically with a radio receiving set, not shown. Such means, as shown, comprises a tongue 6, Figs. 2 and 3, punched from the metal sheet 4 and extended from between the layers 2 and 3 by being extended forwardly through a hole 7 provided through the front layer 2. To the tongue or terminal 6 is attached the conducting wire 8, which leads to the radio receiving set carried by the car 9, Fig. 1.

10 designates the bracket, of usual type, on which is mounted the spare-tire 11 on which my improved tire cover and aerial is to be mounted.

In operation, the tire cover is mounted in the usual manner on the spare-tire 11, the conducting wire 8 being connected to the radio receiving set on the car.

The metal aerial 4 will intercept the radio waves or oscillations, and the conducting wire 8 will carry them to the set.

The tire cover, thus effects the function of an aerial as well as its function of a tire cover. The metal sheet 4 will serve as a reenforcement to the body of the tire cover, as well as a receptor for radio waves.

In the form of my invention shown in Figs. 6 and 7, the tire cover and aerial comprises two semicircular members 12 and 13, of sheet metal, each member having a peripheral semi-annular channel portion 14 adapted to receive the peripheral portion of a spare-tire.

The members 12 and 13 are hinged to each other at one set of ends, as indicated at 15. The upper member 12 has hinged to its opposite end a hasp 16 adapted to receive a staple 17 mounted on the lower member 13. A padlock 18 may be attached to the staple 17, as shown in Fig. 6. The inner side of the body of the member 12 has a terminal comprising a tongue 19 to which may be attached the lead in wire 8 of the radio set.

The lower end of the semi-circular member 12 has a flange 20 which overlaps the upper edge of the member 13, so as to exclude water from passing between the members.

The rubber tire on which the tire cover shown in Figs. 6 and 7 is mounted serves as an insulation support for the aerial and tire cover comprising the members 12 and 13.

The members 12 and 13 will intercept the radio waves or oscillations, and the same will be carried to the receiving set of the car by the conductor 8 attached to the tongue terminal 19. The members 12 and 13 will also serve as a cover for the spare tire on which they are mounted.

By removing the lock 18, and releasing the hasp 16 from the staple 17, the members 12 and 13 may be swung on the hinge connection 15 so as to be removed from the tire, when desired.

I do not limit my invention to the structures shown and described, as many modifications, within the scope of the appended claims, may be made without departing from the spirit of my invention.

What I claim is:—

1. A spare-tire cover and radio aerial comprising a casing having an opening adapted to receive a spare-tire carried by an automobile, and having a closed side comprising two layers of insulation material, and having reenforcing electric conductive means between and insulated by said two layers and adapted to intercept radio waves or oscillations, and an aerial conductor attached to said conductive means and adapted for electrical connection with a radio receiving set adapted to be carried by said automobile.

2. A spare-tire cover and radio aerial comprising a casing having an opening adapted to receive a spare-tire carried by an automobile, and having a closed side comprising two layers of insulation material, a reenforcing electrical conductive plate between and insulated by said layers, and an aerial conductor attached to said plate and adapted for electrical connection with a radio receiving set adapted to be carried by said automobile.

3. An antenna unit for use with automobile radio equipment comprising an annular member of approximately tire diameter having means associated therewith for snugly and concentrically detachably securing said member against the spare tire casing of an automobile, a pick-up element for radio energy, means securing said pick-up element to said annular member, and means whereby said pick-up element may be electrically connected to radio equipment carried by said automobile.

4. An antenna unit for use with automobile radio equipment comprising a fabric cap of such size and shape as to be snugly receivable across the spare tire casing and support of an automobile in the fashion of a conventional drum type tire cover, means associated with the rim of said fabric cap for detachably securing said cap upon said tire casing, a metallic pick-up element for radio energy substantially co-extensive with the body portion of said cap, means securing said pick-up element to said body portion of the cap, and means whereby one end of said pick-up element may be electrically connected to radio equipment carried by said automobile.

5. An antenna unit for use with automobile radio equipment comprising supporting means adapted for secure disposition upon the casing of an automobile spare tire, a pick-up element for radio energy, said pick-up element being of substantially tire diameter, means securing said pick-up element to said support, and means for electrically connecting said pick-up element to radio equipment carried by said automobile.

In testimony whereof I have signed my name to this specification.

FREDERICK W. STEIN.